US012458556B2

United States Patent
Sridar et al.

(10) Patent No.: US 12,458,556 B2
(45) Date of Patent: Nov. 4, 2025

(54) LOW-VOLUME INFLATABLE ACTUATOR COMPOSITES FOR WEARABLE APPLICATIONS AND PORTABLE PNEUMATIC SOURCE

(71) Applicants: Saivimal Sridar, Mesa, AZ (US); Souvik Poddar, Buffalo, NY (US); Wenlong Zhang, Chandler, AZ (US)

(72) Inventors: Saivimal Sridar, Mesa, AZ (US); Souvik Poddar, Buffalo, NY (US); Wenlong Zhang, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 555 days.

(21) Appl. No.: 17/229,313

(22) Filed: Apr. 13, 2021

(65) Prior Publication Data
US 2021/0322252 A1 Oct. 21, 2021

Related U.S. Application Data

(60) Provisional application No. 63/010,622, filed on Apr. 15, 2020.

(51) Int. Cl.
*A61H 3/00* (2006.01)
*B25J 9/00* (2006.01)

(52) U.S. Cl.
CPC .............. *A61H 3/00* (2013.01); *B25J 9/0006* (2013.01); *A61H 2003/007* (2013.01);
(Continued)

(58) Field of Classification Search
CPC ................ A61H 3/00; A61H 2003/007; A61H 2201/1215; A61H 2201/123;
(Continued)

(56) References Cited

U.S. PATENT DOCUMENTS

2003/0044285 A1\* 3/2003 Ding .................. F04B 9/00
  417/53
2018/0296425 A1\* 10/2018 Lamb .................. A61F 5/0125
(Continued)

FOREIGN PATENT DOCUMENTS

AT           400941 B  \* 3/1996  ............. B29C 45/82
WO   WO-2019187030 A1 \* 10/2019

OTHER PUBLICATIONS

Machine Translation WO 2019/187030 (Year: 2019).\*
(Continued)

*Primary Examiner* — Kendra D Carter
*Assistant Examiner* — Arielle Wolff
(74) *Attorney, Agent, or Firm* — SNELL & WILMER L.L.P.

(57) ABSTRACT

Systems and methods for a wearable exoskeleton include an inflatable actuator with a reduced operation volume for faster operation. The inflatable actuator may include a first paddle connectable to the human body, a second paddle connectable to the human body, and an inflatable fabric coupled between the first paddle and the second paddle. In response to the inflatable fabric being filled with compressed air, the rigidity of the inflatable fabric increases, causing the angle between the first paddle and the second paddle to change to provide an assistive force for a movement of the human body. A portable pneumatic source is provided for quickly supplying a compressed air to the inflatable actuator. The portable pneumatic source may include a double acting piston and a cylinder defining a first chamber and a second chamber, and a valve assembly, for compressing air at both the upstroke and downstroke of the piston.

20 Claims, 8 Drawing Sheets

(52) U.S. Cl.
CPC ............... *A61H 2201/1215* (2013.01); *A61H 2201/123* (2013.01); *A61H 2201/1238* (2013.01); *A61H 2201/1409* (2013.01); *A61H 2201/5056* (2013.01); *A61H 2230/00* (2013.01)

(58) Field of Classification Search
CPC .... A61H 2201/1238; A61H 2201/1409; A61H 2201/5056; A61H 2230/00; A61H 2201/1207; A61H 2201/1246; A61H 2201/1642; A61H 2201/165; A61H 2201/5071; A61H 2201/5087; A61H 1/024; B25J 9/0006; B25J 9/142; F04B 27/005; F04B 35/04; F04B 417/415; F04B 417/534

See application file for complete search history.

(56) References Cited

U.S. PATENT DOCUMENTS

2019/0344433 A1* 11/2019 Lerner ................. A61B 5/6811
2020/0376650 A1* 12/2020 Polygerinos ............. B25J 9/142

OTHER PUBLICATIONS

AT 400941 Machine Translation (Year: 1996).*
A. T. Asbeck, S. M. De Rossi, I. Galiana, Y. Ding, and C. J. Walsh, "Stronger, smarter, softer: next-generation wearable robots," IEEE Robotics & Automation Magazine, vol. 21, No. 4, pp. 22-33, 2014.
B. K. Dinh, M. Xiloyannis, L. Cappello, C. W. Antuvan, S.-C. Yen, and L. Masia, "Adaptive backlash compensation in upper limb soft wearable exoskeletons," Robotics and Autonomous Systems, vol. 92, pp. 173-186, 2017.
N. Cheng, G. Ishigami, S. Hawthorne, H. Chen, M. Hansen, M. Telleria, R. Playter, and K. lagnemma, "Design and analysis of a soft mobile robot composed of multiple thermally activated joints driven by a single actuator," in 2010 IEEE International Conference on Robotics and Automation. IEEE, 2010, pp. 5207-5212.
C. D. Onal, X. Chen, G. M. Whitesides, and D. Rus, "Soft mobile robots with on-board chemical pressure generation," In Robotics Research. Springer, 2017, pp. 525-540.
R. K. Katzschmann, A. D. Marchese, and D. Rus, "Autonomous object manipulation using a soft planar grasping manipulator," Soft robotics, vol. 2, No. 4, pp. 155-164, 2015.
M. Giorelli, F. Renda, G. Ferri, and C. Laschi, "A feed-forward neural network learning the inverse kinetics of a soft cable-driven manipulator moving in three-dimensional space," in 2013 IEEE/RSJ International Conference on Intelligent Robots and Systems. IEEE, 2013, pp. 5033-5039.
F. Ilievski, A. D. Mazzeo, R. F. Shepherd, X. Chen, and G. M. Whitesides, "Soft robotics for chemists," Angewandte Chemie International Edition, vol. 50, No. 8, pp. 1890-1895, 2011.
K. C. Galloway, P. Polygerinos, C. J. Walsh, and R. J. Wood, "Mechanically programmable bend radius for fiber- reinforced soft actuators," in 2013 16th International Conference on Advanced Robotics (ICAR). IEEE, 2013, pp. 1-6.
J. Bishop-Moser, G. Krishnan, C. Kim, and S. Kota, "Design of soft robotic actuators using fluid-filled fiber-reinforced elastomeric enclosures in parallel combinations," in 2012 IEEE/RSJ International Conference on Intelligent Robots and Systems. IEEE, 2012, pp. 4264-4269.
G. Krishnan, J. Bishop-Moser, C. Kim, and S. Kota, "Kinematics of a generalized class of pneumatic artificial muscles," Journal of Mechanisms and Robotics, vol. 7, No. 4, p. 041014, 2015.
C. R. Nesler, T. A. Swift, and E. J. Rouse, "Initial design and experimental evaluation of a pneumatic interference actuator," Soft robotics, vol. 5, No. 2, pp. 138-148, 2018.
C. M. Thalman, Q. P. Lam, p. H. Nguyen, S. Sridar, and p. Polygerinos, "A novel soft elbow exosuit to supplement bicep lifting capacity," in 2018 IEEE/RSJ International Conference on Intelligent Robots and Systems (Iros). IEEE, 2018, pp. 6965-6971.
L. Cappello, K. C. Galloway, S. Sanan, D. A. Wagner, R. Granberry, S. Engelhardt, F. L. Haufe, J. D. Peisner, and C. J. Walsh, "Exploiting textile mechanical anisotropy for fabric-based pneumatic actuators," Soft robotics, vol. 5, No. 5, pp. 662-674, 2018.
P. H. Nguyen, S. Sridar, S. Amatya, C. M. Thalman, and P. Polygerinos, "Fabric-based soft grippers capable of selective distributed bending for assistance of daily living tasks," in 2019 2nd IEEE International Conference on Soft Robotics (RoboSoft). IEEE, 2019, pp. 404-409.
S. Sridar, Z. Qiao, N. Muthukrishnan, W. Zhang, and p. Polygerinos, "A soft-inflatable exosuit for knee rehabilitation: Assisting swing phase during walking," Frontiers in Robotics and AI, vol. 5, p. 44, 2018.
P. H. Nguyen, I. I. Mohd, C. Sparks, F. L. Arellano, W. Zhang, and P. Polygerinos, "Fabric soft poly-limbs for physical assistance of daily living tasks," in 2019 International Conference on Robotics and Automation (ICRA). IEEE, 2019, pp. 8429-8435.
S. I. Rich, R. J. Wood, and C. Majidi, "Untethered soft robotics," Nature Electronics, vol. 1, No. 2, p. 102, 2018.
M. T. Tolley, R. F. Shepherd, B. Mosadegh, K. C. Galloway, M. Wehner, M. Karpelson, R. J. Wood, and G. M. Whitesides, "A resilient, untethered soft robot," Soft robotics, vol. 1, No. 3, pp. 213-223, 2014.
R. F. Shepherd, A. A. Stokes, J. Freake, J. Barber, P. W. Snyder, A. D. Mazzeo, L. Cademartiri, S. A. Morin, and G. M. Whitesides, "Using explosions to power a soft robot," Angewandte Chemie International Edition, vol. 52, No. 10, pp. 2892-2896, 2013.
N. W. Bartlett, M. T. Tolley, J. T. Overvelde, J. C. Weaver, B. Mosadegh, K. Bertoldi, G. M. Whitesides, and R. J. Wood, "A 3d-printed, functionally graded soft robot powered by combustion," Science, vol. 349, No. 6244, pp. 161-165, 2015.
D. Ross, M. P. Nemitz, and A. A. Stokes, "Controlling and simulating soft robotic systems: insights from a thermodynamic perspective," Soft Robotics, vol. 3, No. 4, pp. 170-176, 2016.
H.-T. D. Chun, J. O. Roberts, M. E. Sayed, S. Aracri, and A. A. Stokes, "Towards more energy efficient pneumatic soft actuators using a porthamiltonian approach," in 2019 2nd IEEE International Conference on Soft Robotics (RoboSoft). EEE, 2019, pp. 277-282.
J. Chung, R. Heimgartner, C. T. O'Neill, N. S. Phipps, and C. J. Walsh, "Exoboot, a soft inflatable robotic boot to assist ankle during walking: Design, characterization and preliminary tests," in 2018 7th IEEE International Conference on Biomedical Robotics and Biomechatronics (Biorob). IEEE, 2018, pp. 509-516.
M. Wehner, M. T. Tolley, Y. Menguc,, Y.-L. Park, A. Mozeika, Y. Ding, C. Onal, R. F. Shepherd, G. M. Whitesides, and R. J. Wood, "Pneumatic energy sources for autonomous and wearable soft robotics," Soft robotics, vol. 1, No. 4, pp. 263-274, 2014.
H. Wu, A. Kitagawa, H. Tsukagoshi, and C. Liu, "Development of a novel pneumatic power assisted lower limb for outdoor walking by the use of a portable pneumatic power source," in 2007 IEEE International Conference on Control Applications. IEEE, 2007, pp. 1291-1296.
C. Thakur, K. Ogawa, T. Tsuji, and Y. Kurita, "Soft wearable augmented walking suit with pneumatic gel muscles and stance phase detection system to assist gait," IEEE Robotics and Automation Letters, vol. 3, No. 4, pp. 4257-4264, 2018.
S. J. Kim, H. Chang, J. Park, and J. Kim, "Design of a portable pneumatic power source with high output pressure for wearable robotic applications," IEEE Robotics and Automation Letters, vol. 3, No. 4, pp. 4351-4358, 2018.
J. Realmuto and T. Sanger, "A robotic forearm orthosis using soft fabricbased helical actuators," in 2019 2nd IEEE International Conference on Soft Robotics (RoboSoft). IEEE, 2019, pp. 591-596.
W. G. Davids, "Finite-element analysis of tubular fabric beams including pressure effects and local fabric wrinkling," Finite Elements in Analysis and Design, vol. 44, No. 1-2, pp. 24-33, 2007.
S. Sridar, P. H. Nguyen, M. Zhu, Q. P. Lam, and P. Polygerinos, "Development of a soft-inflatable exosuit for knee rehabilitation," in 2017 IEEE/RSJ International Conference on Intelligent Robots and Systems (IROS). IEEE, 2017, pp. 3722-3727.

(56) References Cited

OTHER PUBLICATIONS

W. Zhang, M. Tomizuka, and N. Byl, "A wireless human motion monitoring system for smart rehabilitation," Journal of Dynamic Systems, Measurement, and Control, vol. 138, No. 11, p. 111004, 2016.
P. T. Chinimilli, S. Redkar, and W. Zhang, "Human activity recognition using inertial measurement units and smart shoes," in 2017 American Control Conference (ACC). IEEE, 2017, pp. 1462-1467.
P. H. Nguyen, I. I. Mohd, C. Sparks, F. L. Arellano, W. Zhang, and P. Polygerinos, "Fabric soft poly-limbs for physical assistance of daily living tasks," arXiv preprint arXiv:1903.07852, 2019.

* cited by examiner

LOW-VOLUME INFLATABLE ACTUATOR COMPOSITES FOR WEARABLE APPLICATIONS AND PORTABLE PNEUMATIC SOURCE

CROSS REFERENCE TO RELATED APPLICATIONS

This application claims priority to, and the benefit of, U.S. Provisional Patent Application Ser. No. 63/010,622, entitled "LOW-VOLUME INFLATABLE ACTUATOR COMPOSITES FOR WEARABLE APPLICATIONS AND PORTABLE PNEUMATIC SOURCE," filed on Apr. 15, 2020. The content of the foregoing application is hereby incorporated by reference (except for any subject matter disclaimers or disavowals, and except to the extent of any conflict with the disclosure of the present application, in which case the disclosure of the present application shall control).

TECHNICAL FIELD

The present disclosure relates to generally wearable robotics, and in particular to soft robotic actuators.

BACKGROUND

In a wide variety of situations, people of ordinary ability often consume a great deal of energy when walking and carrying a load. Research is being actively conducted into wearable robots for a variety of applications, for example, enhancement of muscular power of disabled or elderly people to assist them with walking, rehabilitation treatment for people having diseases, and lifting and carrying of heavy loads for soldiers or industrial workers.

Robotics is a field of enormous (and growing) importance, in fields from assembly to surgery. Most robotic systems are "hard", that is, composed of metallic structures with joints based on conventional bearings. These structures are often modeled after animal limbs (although structures not found in nature—for example, wheels and treads—are also common in mobile robots).

In an effort to build robots that can carry out sophisticated tasks in unstructured environments, researchers continue to emulate living creatures and their materials, morphology and movements. Over the last several years, soft robotic manipulators have generated significant interest due to their wide range of potential applications that are challenging for "hard" robots. While a wide variety of applications have been demonstrated for soft pneumatic actuators and robots, the portability of pneumatic systems has not been entirely explored.

SUMMARY

A wearable exoskeleton is disclosed, comprising a controller, a human motion monitoring sensor, a pneumatic compressor, an electric motor, a first valve, and an inflatable actuator. The human motion monitoring sensor is configured to send a signal to the controller for monitoring a gait pattern of a human body. The pneumatic compressor comprises a cylinder, a piston, a first chamber, and a second chamber. The electric motor is configured to move the piston between a first piston position and a second piston position. The first valve is in fluid communication with the pneumatic compressor, the first valve configured to move between a first valve position and a second valve position. The inflatable actuator comprises a first paddle, a second paddle, and an inflatable fabric coupled between the first paddle and the second paddle, wherein the inflatable fabric is in fluid communication with the pneumatic compressor. The controller is configured to cause the pneumatic compressor to move a compressed air with the first valve into the inflatable fabric to adjust an angle of the first paddle with respect to the second paddle based upon the gait pattern.

In various embodiments, the pneumatic compressor is configured to move the compressed air into the inflatable fabric to adjust an angle of the first paddle with respect to the second paddle to assist a movement of a human body.

In various embodiments, the first paddle is configured to be coupled to an upper portion of a leg, the second paddle is configured to be coupled to a lower portion of the leg, and the inflatable actuator provides an assistive force for assisting knee extension in response to the inflatable fabric filling with the compressed air.

In various embodiments, the wearable exoskeleton further comprises a pressure sensor in fluid communication with the inflatable fabric, wherein the controller monitors a pressure of the compressed air with the pressure sensor.

In various embodiments, the human motion monitoring sensor is coupled to a shoe.

In various embodiments, in response to the first valve moving to the first valve position, the first valve is in fluid communication with the first chamber. In various embodiments, in response to the first valve moving to the second valve position, the first valve is in fluid communication with the second chamber.

In various embodiments, the wearable exoskeleton further comprises a lead screw and a connecting member, wherein the electric motor is coupled to the piston via the lead screw and the connecting member.

In various embodiments, the wearable exoskeleton further comprises a first one-way valve in fluid communication with the first chamber, and a second one-way valve in fluid communication with the second chamber.

In various embodiments, the wearable exoskeleton further comprises a hose extending from the inflatable fabric, wherein the hose is in fluid communication with the pneumatic compressor.

In various embodiments, the inflatable fabric comprises a heat-sealable thermoplastic polyurethane membrane encased in a fabric material.

An inflatable actuator is disclosed, comprising a first paddle disposed at a first end of the inflatable actuator, a second paddle disposed at a second end of the inflatable actuator, and an inflatable fabric coupled between the first paddle and the second paddle. An angle of the first paddle with respect to the second paddle is configured to vary in response to the inflatable fabric at least one of inflating and deflating.

In various embodiments, a length of the inflatable fabric is between five percent and eighty percent of a total length of the inflatable actuator measured from the first end to the second end.

In various embodiments, the length of the inflatable fabric is between ten percent and seventy percent of the total length of the inflatable actuator.

In various embodiments, the length of the inflatable fabric is between fifteen percent and fifty percent of the total length of the inflatable actuator.

In various embodiments, the first paddle comprises a first half and a second half, wherein a portion of the inflatable fabric is disposed between the first half and the second half. The first half and the second half comprise opposing concave surfaces defining a cavity, wherein the inflatable fabric is disposed at least partially within the cavity.

In various embodiments, the inflatable fabric comprises a heat-sealable thermoplastic polyurethane membrane encased in a fabric material.

A portable pneumatic source is disclosed, comprising a pneumatic compressor comprising a cylinder, a piston, a first chamber, and a second chamber, an electric motor comprising a shaft, a lead screw configured to rotate with the shaft, and a connecting member threadingly coupled to the lead screw. In response to rotation of the lead screw, the connecting member is configured to translate axially along the lead screw, and the piston is configured to move with the connecting member between a first position and a second position.

In various embodiments, the pneumatic compressor is configured to compress air within the first chamber in response to the piston moving to the first position and the pneumatic compressor is configured to compress air within the second chamber in response to the piston moving to the second position.

In various embodiments, the portable pneumatic source further comprises a first limit switch disposed at a first end of the lead screw and a second limit switch disposed at a second end of the lead screw, wherein the electric motor is configured to switch from a first rotational direction to a second rotational direction in response to the connecting member contacting the first limit switch and the electric motor is configured to switch from the second rotational direction to the first rotational direction in response to the connecting member contacting the second limit switch.

In various embodiments, the portable pneumatic source further comprises a frame configured to secure the pneumatic compressor relative to the electric motor. In various embodiments, the portable pneumatic source further comprises a linear guide rod configured to guide linear movement of the connecting member.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, the connecting lines shown in various figures contained herein are intended to represent exemplary functional relationships and/or physical couplings between various elements. It should be noted that many alternative or additional functional relationships or physical connections may be present in inflatable actuators, soft robotic systems, and/or the like.

Pneumatic soft robots are typically tethered in nature due to the high energy costs for actuation as well as the lack of portable pneumatic sources capable of providing high pressures and air flow rates. In this regard, the application of pneumatic soft robots can be limited by factors such as operational pressure and air flow rates. Typically, the speed of portable soft robots is limited either by on-board air compressor units, which do not provide both high flow and pressure outputs required for dynamic applications or combustion-based methods which often are uncontrollable and loud. The present disclosure provides a low-volume inflatable actuator composite (IAC) designed to reduce energy costs of actuation and a portable pneumatic source to overcome the aforementioned issues toward untethered applications.

In various embodiments, the present disclosure provides one or more IACs and portable pneumatic source integrated with a soft exosuit to assist human motion. Although described herein with respect to knee extension, it should be understood that the systems and methods of the present disclosure may be similarly applied to other joints on the human body for physical assistance without departing from the spirit or scope of the present disclosure.

Figure 1:
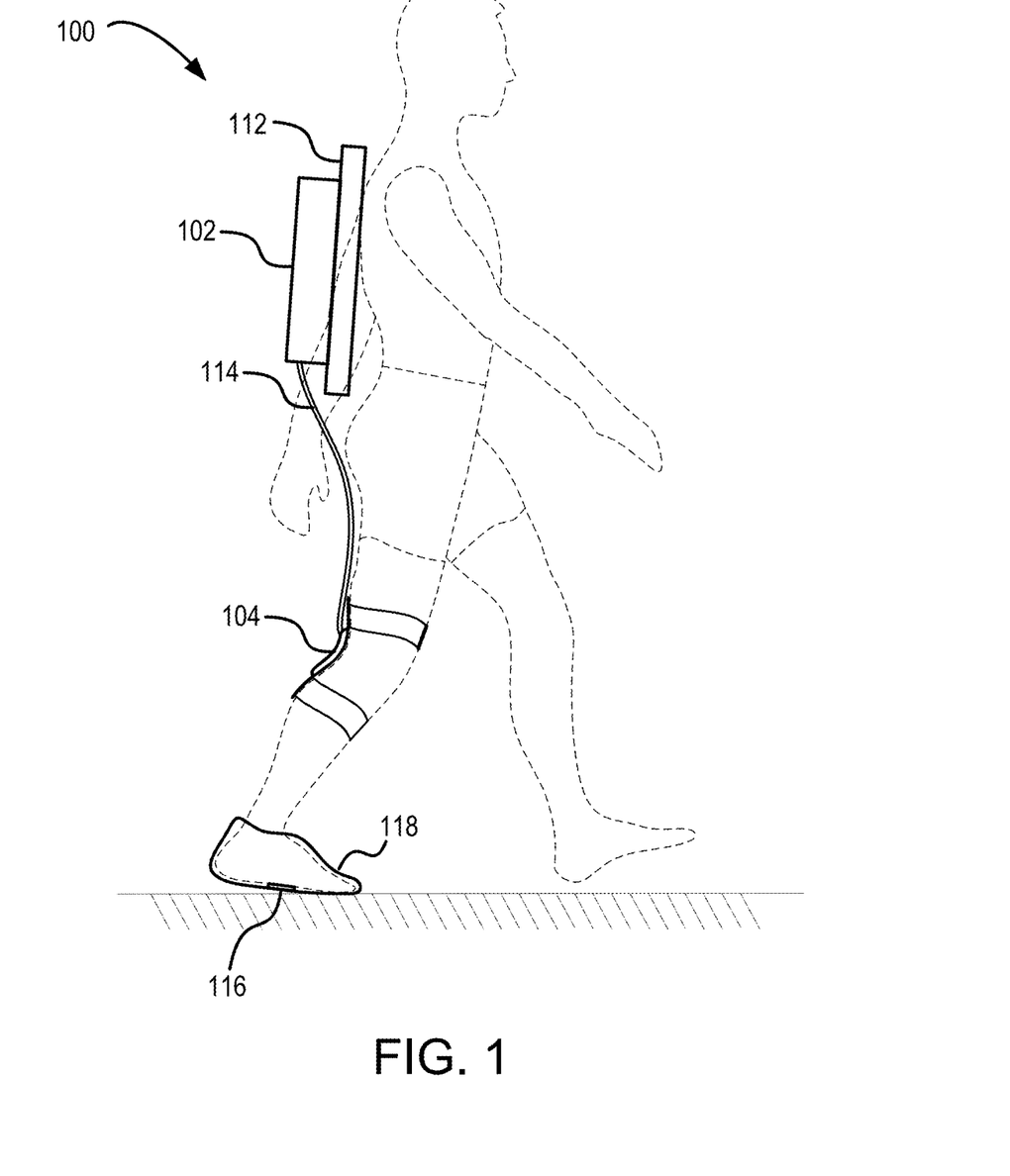
FIG. 1 illustrates an exemplary inflatable exoskeleton system, in accordance with an exemplary embodiment.

With reference to FIG. 1, an exemplary wearable inflatable exoskeleton system 100 (also referred to herein as "system" and/or "wearable exoskeleton") in accordance with principles of the present disclosure is shown, in accordance with various exemplary embodiments. System 100 may be wearable by a person so as to decrease the wearer's energy consumption during walking, jogging, and/or running. System 100 may include a portable pneumatic source arrangement 102 wearable by a person, in accordance with various embodiments. Pneumatic source arrangement 102 may be mounted to a frame 112 wearable by a person. For example, frame 112 may be worn as a backpack, although frame 112 may be worn in any suitable manner. System 100 further includes an inflatable actuator 104 to assist movement of the human body. Pneumatic source arrangement 102 may be in fluid communication with inflatable actuator 104 via a hose 114.

A sensor 116 (also referred to herein as a human motion monitoring sensor) may be provided for monitoring a gait pattern of a wearer. Sensor 116 may be configured to send a signal to a controller (e.g., see control unit 330 in FIG. 3) for determining when to inflate and deflate the inflatable actuator 104 in accordance with the gait or cadence of the wearer to timely transmit forces generated by the inflatable actuator to the leg. Sensor 116 may comprise a pressure sensor, an inertial sensor, or any other suitable sensor for detecting a gait pattern of the wearer.

Although only one inflatable actuator 104 is depicted, a second inflatable actuator 104 may be provided, for example on the wearer's other leg. Similarly, although only one sensor 116 is illustrated, a second sensor 116, or more sensors, may be provided, for example on the wearer's other foot.

Figure 2:
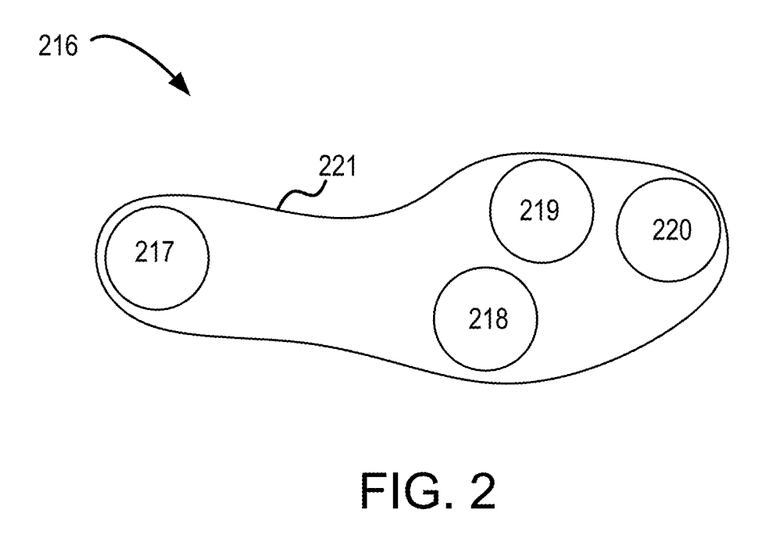
FIG. 2 illustrates exemplary human motion monitoring sensors for a shoe, in accordance with an exemplary embodiment.

In various embodiments, sensor 116 may be incorporated in a wearer's shoe 118. Furthermore, sensor 116 may include a suite of sensors for recognizing the activities of the wearer based on ground contact forces and/or the knee joint angles. With reference to FIG. 2, exemplary human motion monitoring sensors 216 are illustrated incorporated onto the bottom of the sole 221 of a shoe. Sensors 216 may comprise a first sensor 217 disposed at the heel, a second sensor 218 disposed at the fourth metatarsophalangeal joint, a third sensor 219 disposed at the first metatarsophalangeal joint, and/or a fourth sensor 220 disposed at the toe.

In various embodiments, inflatable actuator 104 may be inflated and deflated when a heel strike and toe off, respectively, is detected. In various embodiments, inflatable actuator 104 may be inflated when a ground reaction force measurement is greater than a predetermined percentage of the user's body weight and de-pressurized otherwise. In various embodiments, inflatable actuator 104 is inflated when a ground reaction force measurement is greater than 5% of the user's body weight. In various embodiments, inflatable actuator 104 is inflated when a ground reaction force measurement is greater than 10% of the user's body weight. In various embodiments, inflatable actuator 104 is inflated when a ground reaction force measurement is greater than 15% of the user's body weight.

Figure 3:
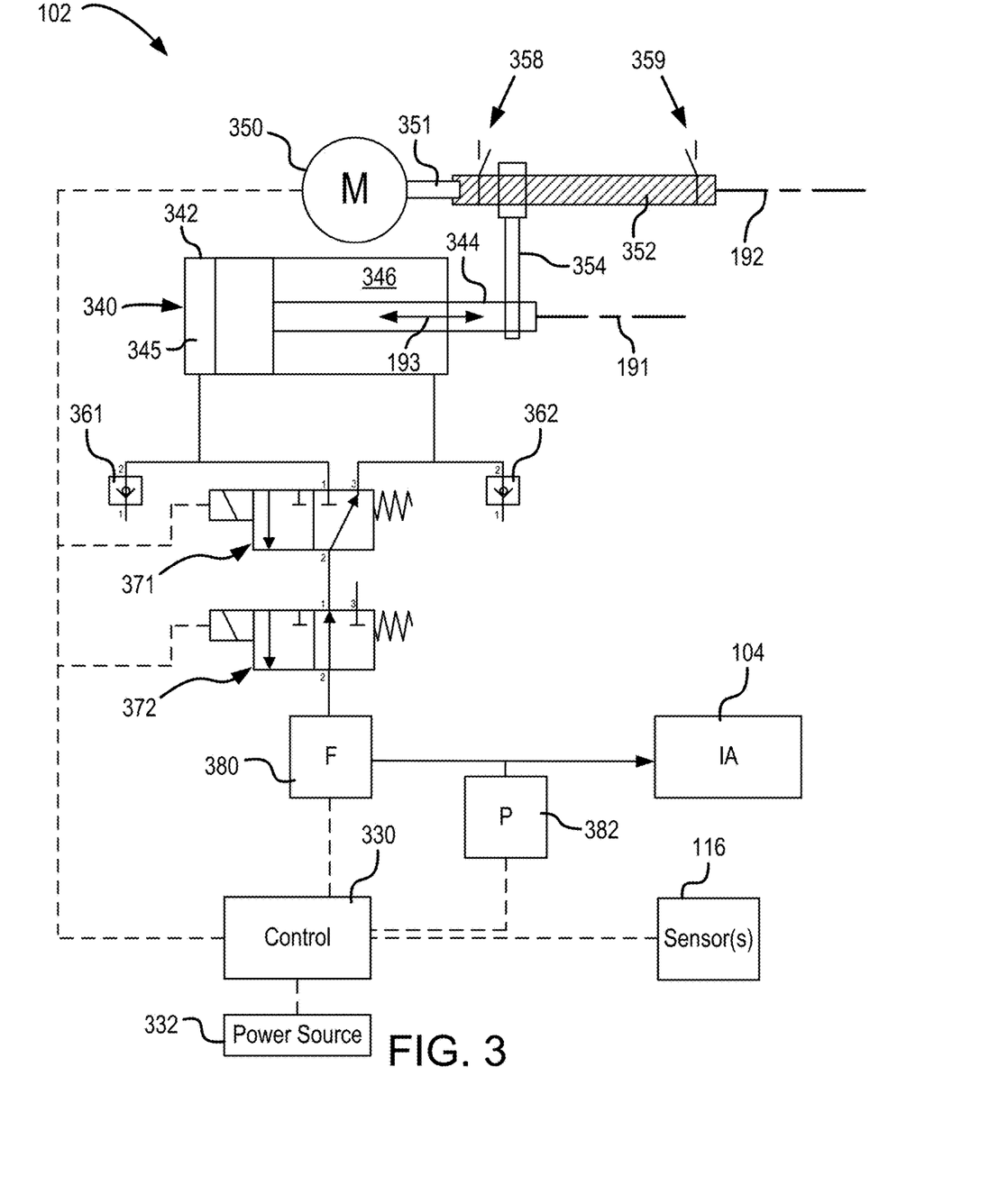
FIG. 3 illustrates a schematic view of an exemplary portable pneumatic source arrangement connected with an inflatable actuator, in accordance with an exemplary embodiment.

With reference to FIG. 3, a schematic view of portable pneumatic source arrangement 102 connected with an inflatable actuator 104 is illustrated, in accordance with various embodiments. In FIG. 3, electronic couplings (e.g., wired or wireless) are shown with dashed lines. In various embodiments, the pneumatic source arrangement 102 includes a control unit 330, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 330 controls, at least various parts of, and operation of, various components of the pneumatic source arrangement 102. For example, the control unit 330 controls valve positions and electric motor speed and direction. Portable pneumatic source arrangement 102 may further include a power source 332 for powering various components of pneumatic source arrangement 102. Power source 332 may comprise a battery, for example.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the pneumatic source arrangement 102 further includes a pneumatic compressor 340 for supplying compressed air to pneumatic source arrangement 102. Pneumatic compressor 340 may comprise a cylinder 342 and a piston 344. Piston 344 may reciprocate along axis 191, as represented by arrow 193, to generate compressed air. Pneumatic compressor 340 may further comprise a first chamber 345 and a second chamber 346. First chamber 345 may be hermetically sealed from second chamber 346 via piston 344.

In various embodiments, the pneumatic source arrangement 102 further includes a first one-way valve 361 and a second one-way valve 362. First one-way valve 361 may be in fluid communication with first chamber 345. Second one-way valve 362 may be in fluid communication with second chamber 346. As piston 344 moves along axis 191 in a first direction (e.g., as piston 344 retracts into cylinder 342), air in first chamber 345 may be compressed as ambient air is drawn through one-way valve 362 into second chamber 346. As piston 344 moves along axis 191 in a second direction (e.g., as piston 344 extends from cylinder 342), air in second chamber 346 may be compressed as ambient air is drawn through one-way valve 361 into first chamber 345. In this regard, pneumatic compressor 340 includes a double acting piston for compressing air at both the upstroke and downstroke of the piston. In various embodiments, as disclosed herein, pneumatic compressor 340 is capable of generating a pressure and flow rate of at least 0.131 Megapascal (MPa) and 21.45 standard liter per minute (SLPM), respectively.

Figure 4A:
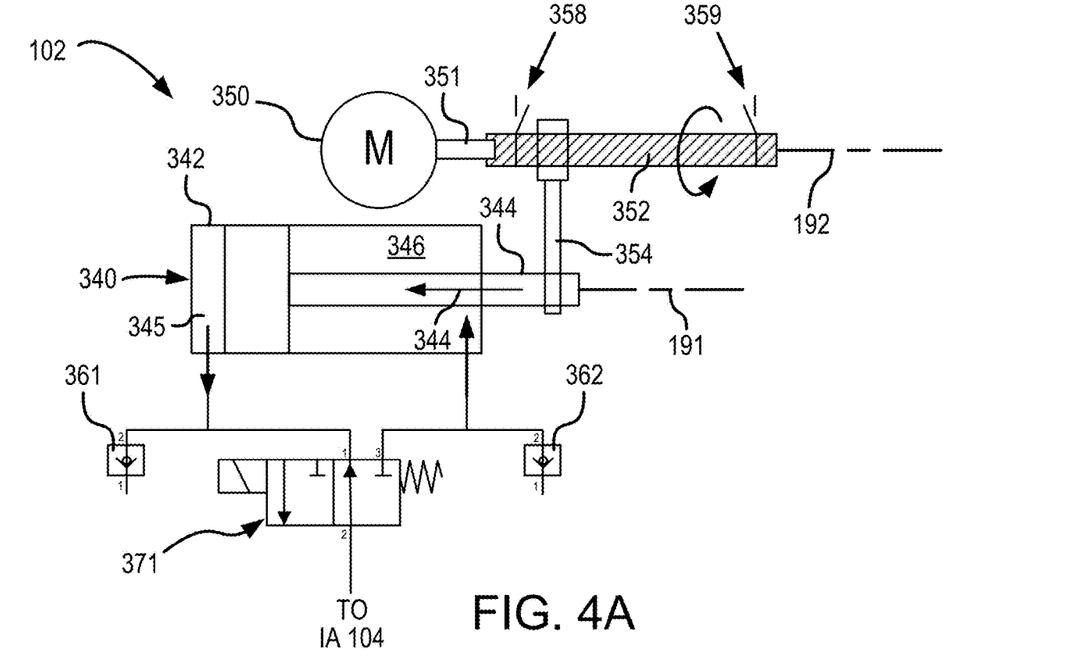
FIGS. 4A and 4B illustrate a portion of the portable pneumatic source arrangement of FIG. 3, with a pneumatic compressor piston in a first position and a second position, respectively, in accordance with exemplary embodiments.
Figure 4B:
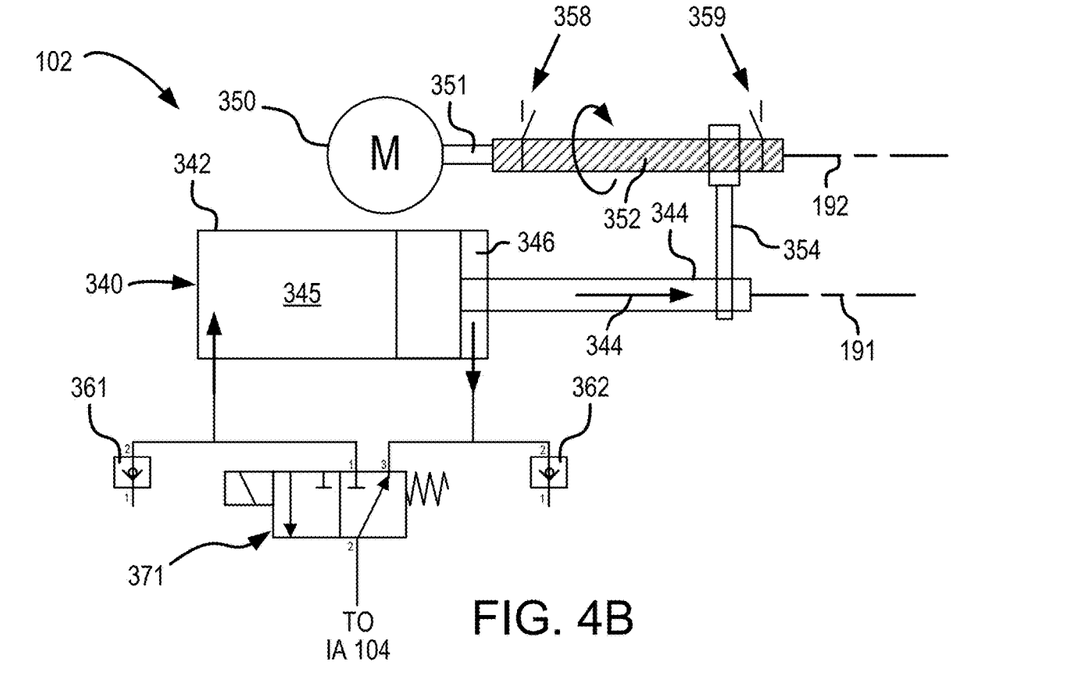

In various embodiments, the pneumatic source arrangement 102 further includes an electric motor 350. Electric motor 350 may comprise a high-torque DC motor. Electric motor 350 may be controlled by control unit 330. Electric motor 350 may comprise a shaft 351 coupled to a lead screw 352. Shaft 351 may be coaxial with lead screw 352 about axis 192. The pneumatic source arrangement 102 may further include a connecting member 354. A first end of connecting member 354 may be threadingly coupled to lead screw 352 and a second end of connecting member 354 may be coupled to piston 344. Lead screw 352 may rotate with shaft 351 about axis 192. In response to rotation of the lead screw 352, the connecting member 354 is configured to translate axially along the lead screw 352. The piston 344 is configured to move with the connecting member 354 between a first position (e.g., see FIG. 4A; also referred herein as a first piston position) and a second position (e.g., see FIG. 4B; also referred to herein as a second piston position) to generate compressed air. The side-by-side arrangement of electric motor 350 and pneumatic compressor 340 may reduce an overall length of pneumatic source arrangement 102.

In various embodiments, the pneumatic source arrangement 102 further includes a first limit switch 358 disposed at a first end of the lead screw 352 and a second limit switch 359 disposed at a second end of the lead screw 352. The electric motor 350 may be configured to switch from a first rotational direction (e.g., see FIG. 4A) to a second rotational direction (e.g., see FIG. 4B) in response to the connecting member 354 contacting the first limit switch 358. The electric motor 350 may be configured to switch from the second rotational direction to the first rotational direction in response to the connecting member 354 contacting the second limit switch 359. For example, first limit switch 358 and/or second limit switch 359 may be configured to close a circuit in response to being contacted by connecting member 354 to indicate to control unit 330 to change to direction of rotation of lead screw 352. In this regard, control unit 330 may be in electric communication (e.g., wired or wirelessly) with first limit switch 358 and second limit switch 359.

In various embodiments, the pneumatic source arrangement 102 further includes a valve 371 (also referred to herein as a first valve) in fluid communication with the pneumatic compressor 340. Valve 371 may be a solenoid valve, in accordance with various embodiments. Valve 371 may be configured to move between a first position (see FIG. 4A; also referred to herein as a first valve position), wherein valve 371 directs compressed air from first chamber 345 to inflatable actuator 104, and a second position (see FIG. 4B; also referred to herein as a second valve position), wherein valve 371 directs compressed air from second chamber 346 to inflatable actuator 104. In this regard, in response to the valve 371 moving to the first position, the valve 371 is in fluid communication with the first chamber 345, and, in response to the valve 371 moving to the second position, the valve 371 is in fluid communication with the second chamber 346.

Figure 5:
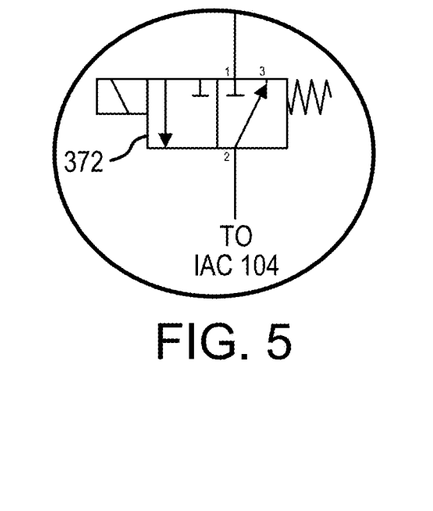
FIG. 5 illustrates a second valve of the portable pneumatic source arrangement of FIG. 3, with the valve in a second position for deflating an inflatable actuator, in accordance with an exemplary embodiment.

In various embodiments, the pneumatic source arrangement 102 further includes a valve 372 (also referred to herein as a second valve) in fluid communication with the inflatable actuator 104. Valve 372 may be a solenoid valve, in accordance with various embodiments. Valve 372 may be configured to move between a first position (see FIG. 3), wherein valve 372 directs compressed air from pneumatic compressor 340 to inflatable actuator 104, and a second position (see FIG. 5), wherein valve 372 directs compressed air from within inflatable actuator 104 to an outside location (e.g., to ambient air). In this manner, valve 372 may open to release (i.e., decrease) pressure inside inflatable actuator 104. In various embodiments, valve 371 and valve 372 are connected in series, though valve 371 may be coupled to inflatable actuator 104 independent of valve 372.

In various embodiments, the pneumatic source arrangement 102 further includes a flow sensor 380 for measuring a flow rate of air entering or leaving inflatable actuator 104. Flow sensor 380 may be in electric communication with control unit 330. In various embodiments, the pneumatic source arrangement 102 further includes a pressure sensor 382 for measuring a pressure of air in inflatable actuator 104. Pressure sensor 382 may be in electric communication with control unit 330. Control unit 330 may monitor the pressure of compressed air in inflatable actuator 104 with the pressure sensor 382.

Figure 6:
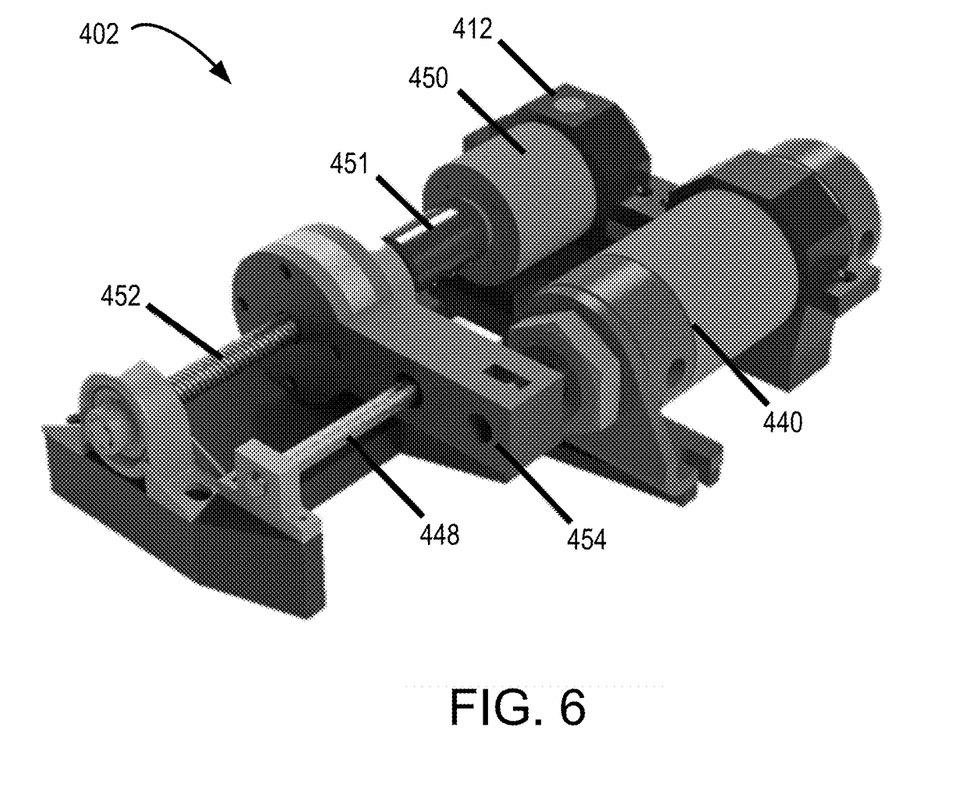
FIG. 6 illustrates an exemplary portable pneumatic source including an electric motor and a compressor, in accordance with an exemplary embodiment.

With reference to FIG. 6, a perspective view of an exemplary portable pneumatic source arrangement 402 is illustrated, in accordance with various embodiments. In various embodiments, portable pneumatic source arrangement 102 may be similar to portable pneumatic source arrangement 402. Portable pneumatic source arrangement 402 may include an electric motor 450 comprising a shaft 451, a lead screw 452 coupled to the shaft, a pneumatic compressor 440, and a connecting member 454. Portable pneumatic source arrangement 402 may further include a frame 412 upon which the components of portable pneumatic source arrangement 402 are mounted. Portable pneumatic source arrangement 402 may further include a linear guide rod 448. In various embodiments, guide rod 448 may extend through connecting member 454. Guide rod 448 may be oriented parallel to lead screw 452. Guide rod 448 may aid in keeping connecting member 454 perpendicularly aligned with lead screw 452. The operation of motor 450, shaft 451, lead screw 452, pneumatic compressor 440, and connecting member 454 may be similar to that of motor 350, shaft 351, lead screw 352, pneumatic compressor 340, and connecting member 354 of FIG. 3 and is not repeated for sake of clarity.

Figure 7A:
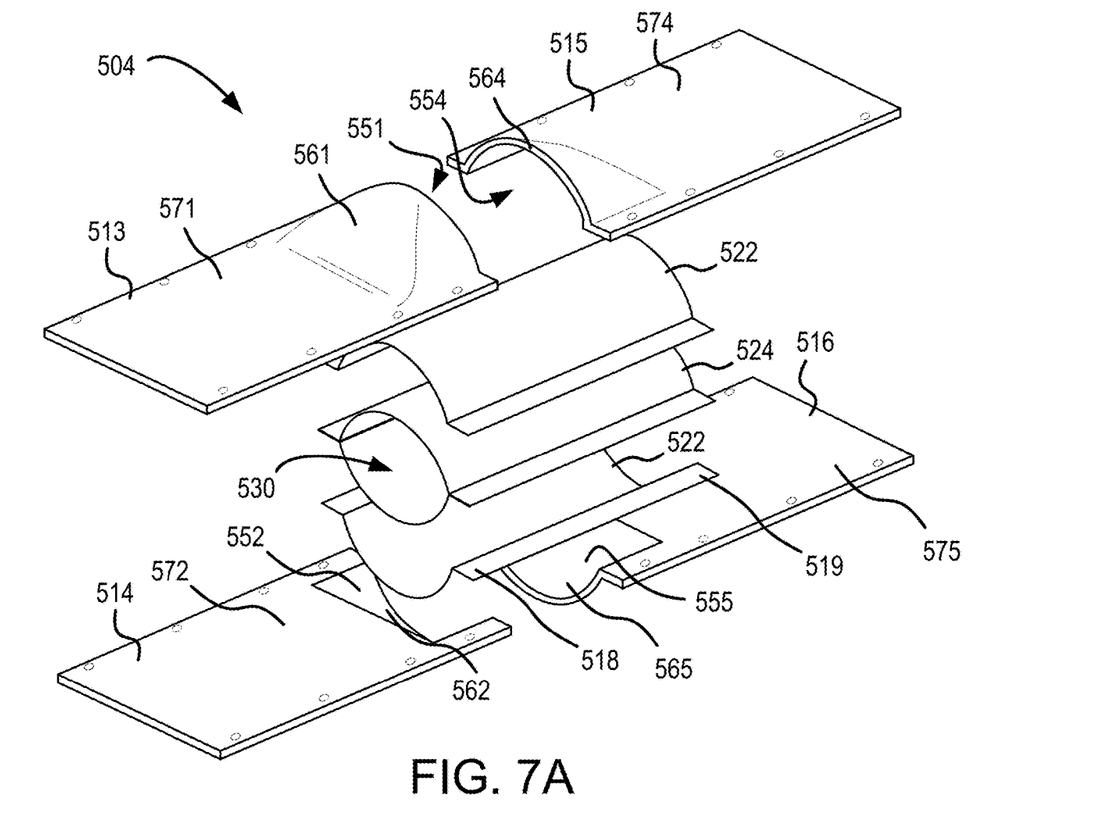
FIGS. 7A and 7B illustrate an exploded view and assembled view, respectively, of an inflatable actuator, in accordance with an exemplary embodiment.
Figure 7B:
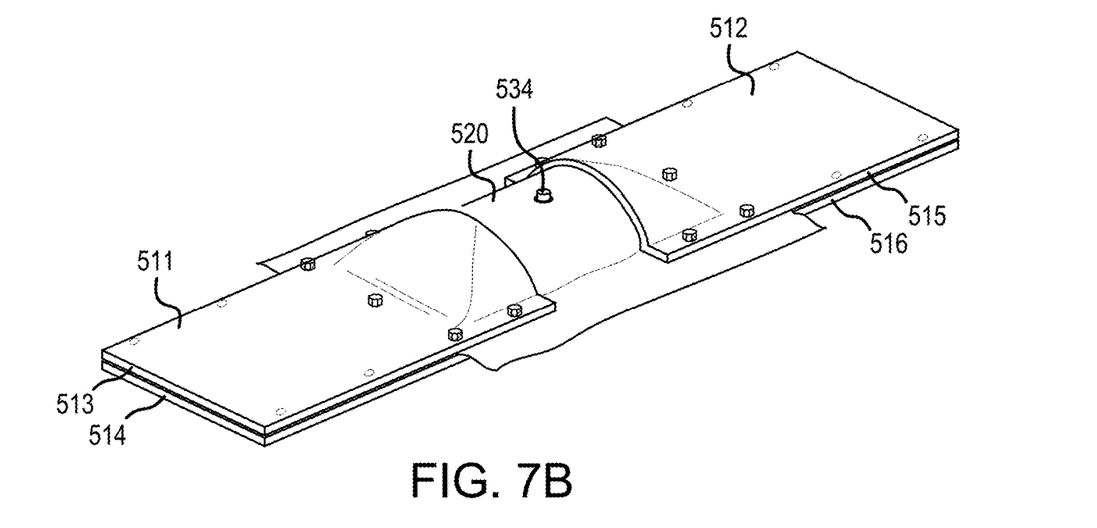

With reference to FIG. 7A and FIG. 7B, an inflatable actuator 504 is illustrated, in accordance with various embodiments. In various embodiments, inflatable actuator 104 may be similar to inflatable actuator 504. To reduce internal volume of inflatable fabric 520, a soft-rigid composite system is provided, which reduces the overall volume of the inflatable actuator 504. Inflatable actuator 504 includes a first paddle 511, a second paddle 512, and an inflatable fabric 520 coupled between the first paddle 511 and the second paddle 512. The inflatable fabric 520 may be in fluid communication with a pneumatic compressor (e.g., pneumatic compressor 340 of FIG. 3).

Inflatable fabric 520 may include a fabric 522 lined with a film layer 524 to hermetically seal fabric 522. Fabric 522 may include sheets of material connected (e.g., sewn and or adhered) at their peripheral edges to form a chamber 530. Fabric 522 may be made of a polyester material, a polyamide material, or any other suitable material. Film layer 524 may comprise a thermoplastic polyurethane (PTU) material, though other material may be used to seal fabric 522. In various embodiments, film layer 524 is a heat-sealable thermoplastic polyurethane membrane. Film layer 524 may be encased in fabric 522. Fabric 522 may reinforce the structural strength of film layer 524. Inflatable fabric 520 may comprise a generally non-elastic material to increase the rigidity of inflatable fabric 520 when inflatable fabric 520 is filled with compressed air. Inflatable fabric 520 may include a port 534 whereby a hose (e.g., hose 114 of FIG. 1) may be coupled to the inflatable fabric 520. The hose may extend from inflatable fabric 520 whereby the inflatable fabric is in fluid communication with a pneumatic compressor (e.g., pneumatic compressor 340 of FIG. 3).

In various embodiments, first paddle 511 includes a first half 513 with a first flange 571 and a first arcuate flange 561 and a second half 514 with a second flange 572 and a second arcuate flange 562. A portion 518 of the inflatable fabric 520 may be disposed between the first half 513 and the second half 514. In various embodiments, second paddle 512 includes a first half 515 with a first flange 574 and a first arcuate flange 564 and a second half 516 with a second flange 575 and a second arcuate flange 565. A portion 519 of the inflatable fabric 520 may be disposed between the first half 515 and the second half 516.

With combined reference to FIG. 7A through FIG. 8A, first half 513 and second half 514 may comprise opposing concave surfaces, such as concave surface 551 and concave surface 552, respectively. Concave surface 551 of arcuate flange 561 and concave surface 552 of arcuate flange 562 may define a cavity 553. The inflatable fabric 520 may be partially disposed within the cavity 553. In various embodiments, first half 515 and second half 516 may similarly comprise opposing concave surfaces, such as concave surface 554 and concave surface 555, respectively. Concave surface 554 of arcuate flange 564 and concave surface 555 of arcuate flange 565 may define a cavity 556. The inflatable fabric 520 may be partially disposed within the cavity 556. In this manner, first paddle 511 and second paddle 512 may accommodate the inflation of inflatable fabric 520.

Figure 8A:
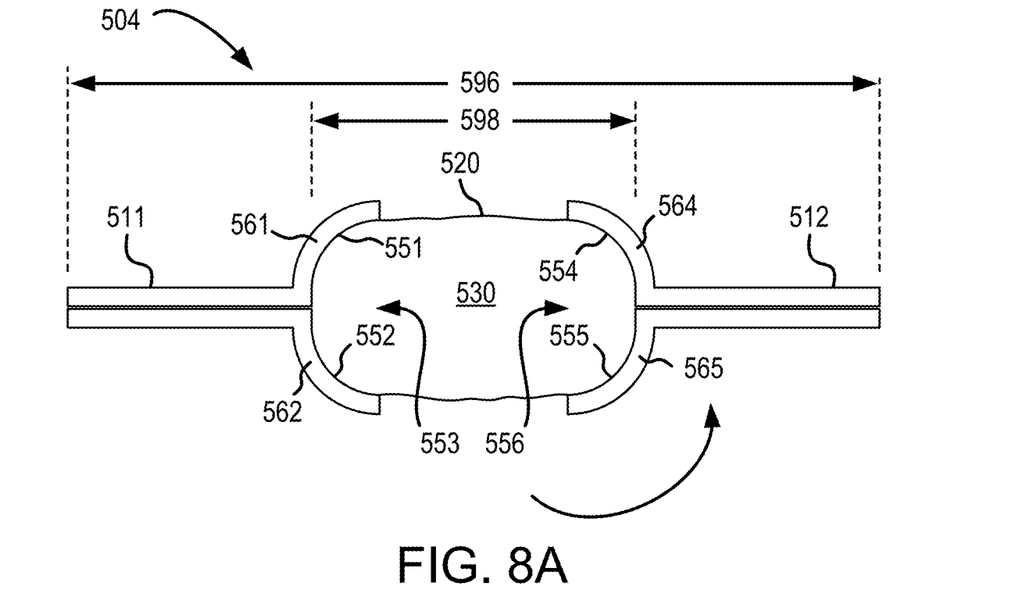
FIGS. 8A and 8B illustrate section views of the inflatable actuator of FIGS. 7A and 7B, with the inflatable actuator in an inflated state and a deflated state, respectively, in accordance with an exemplary embodiment.
Figure 8B:
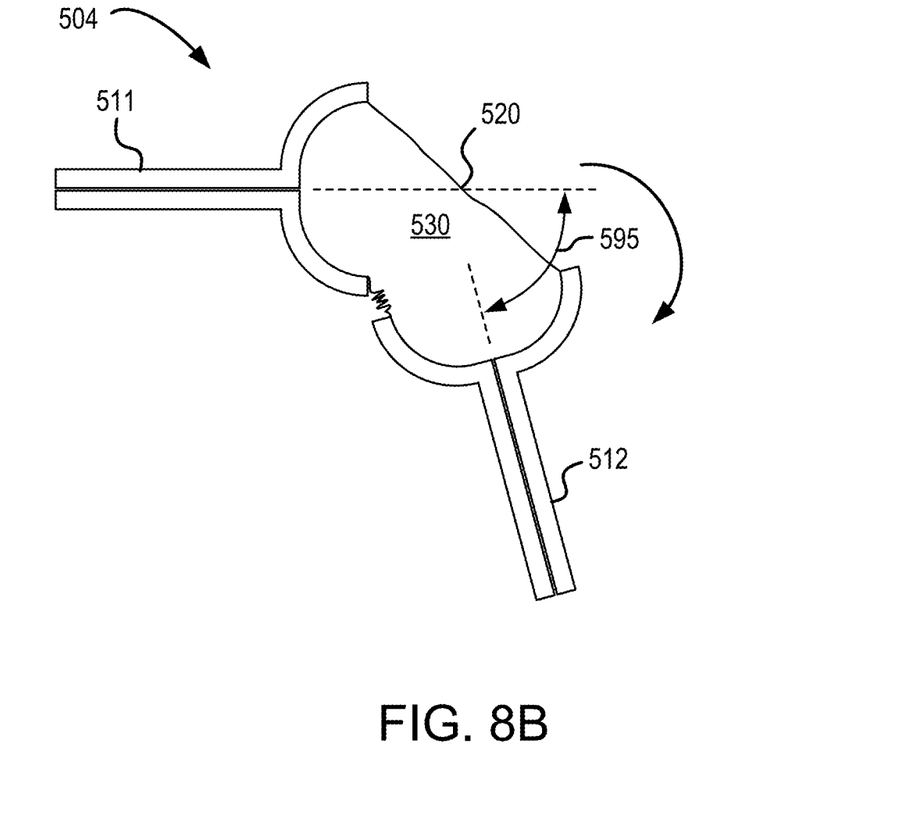

With reference to FIG. 8A and FIG. 8B, compressed air may enter inflatable fabric 520 to adjust an angle 595 of the first paddle 511 with respect to the second paddle 512. In various embodiments, the first paddle 511 may be configured to be coupled to an upper portion of a user's leg, and the second paddle 512 may be configured to be coupled to a lower portion of the user's leg. In this manner, the inflatable actuator 504 provides an assistive force for assisting knee extension in response to the inflatable fabric filling with compressed air, based upon a gait pattern of the user. For example, inflatable actuator 504 may be placed at the back of a user's leg at the knee joint.

For example, with reference to FIG. 8A, inflatable fabric 520 may be inflated with compressed air to cause first paddle 511 to align generally parallel with second paddle 512. With reference to FIG. 8B, inflatable fabric 520 may be deflated to allow first paddle 511 to rotate with respect to second paddle 512. In this manner, the angle 595 between first paddle 511 and second paddle 512 may vary.

With reference to FIG. 8A, a length 598 of the inflatable fabric 520 may be less than the total length 596 of inflatable actuator 504 to reduce the overall inflatable volume of inflatable actuator 504 and reduce the energy cost of actuation. In various embodiments, the length 598 of the inflatable fabric 520 is between five percent and eighty percent (5%-80%) of the total length 596 of inflatable actuator 504. In various embodiments, the length 598 of the inflatable fabric 520 is between ten percent and seventy percent (10%-70%) of the total length 596 of inflatable actuator 504. In various embodiments, the length 598 of the inflatable fabric 520 is between fifteen percent and fifty percent (15%-50%) of the total length 596 of inflatable actuator 504. In various embodiments, the length 598 of the inflatable fabric 520 is between fifteen percent and forty percent (15%-40%) of the total length 596 of inflatable actuator 504.

Figure 9:
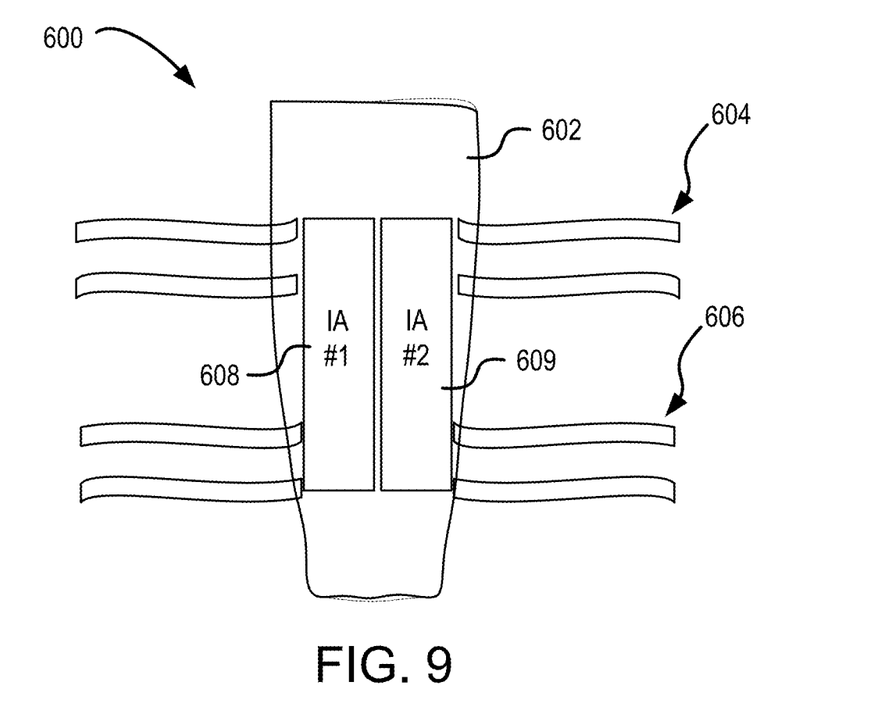
FIG. 9 illustrates an exemplary inflatable actuator carrier, in accordance with an exemplary embodiment.

With reference to FIG. 9, an inflatable actuator carrier arrangement 600 is illustrated, in accordance with various embodiments. In various embodiments, inflatable actuator 104 may be similar to inflatable actuator carrier arrangement 600. Inflatable actuator carrier arrangement 600 includes a sleeve 602. Sleeve 602 may be configured to be placed over a user's leg. For example, a user may insert their leg through sleeve 602 to secure one or more inflatable actuators to the user's leg. The sleeve 602 may comprise a plurality of straps 604 configured to secure sleeve 602 to the user's upper leg. The sleeve 602 may comprise a plurality of straps 606 configured to secure sleeve 602 to the user's lower leg. The sleeve 602 may further include one or more inflatable actuators extending longitudinally along sleeve 602, such as first inflatable actuator 608 and second inflatable actuator 609. First inflatable actuator 608 and second inflatable actuator 609 may be similar to inflatable actuator 504 of FIGS. 7A through 8B. First inflatable actuator 608 and second inflatable actuator 609 may be secured to sleeve 602 such that first inflatable actuator 608 and second inflatable actuator 609 are placed at the rear knee joint when installed on a user's leg. First inflatable actuator 608 and second inflatable actuator 609 may provide an assistive force for assisting knee extension in response to the inflatable actuator 609 filling with compressed air.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wearable exoskeleton comprising:
a portable pneumatic source configured to be wearable by a person, the portable pneumatic source comprising:
a controller,
a pneumatic compressor comprising a cylinder, a piston, a first chamber, and a second chamber,
an electric motor configured to move the piston between a first piston position and a second piston position, and
a first valve in fluid communication with the pneumatic compressor, the first valve configured to move between a first valve position and a second valve position;
an inflatable actuator comprising a first paddle, a second paddle, and an inflatable fabric coupled between the first paddle and the second paddle,
wherein the first paddle and the second paddle each include a first half defined by a first flange and a first arcuate flange and a second half defined by a second flange and a second arcuate flange, the first flange and the second flange extending away from the first arcuate flange and the second arcuate flange in a direction such that the first half and the second half comprise opposing concave surfaces defined by the first arcuate flange and the second arcuate flange, the opposing concave surfaces defining a cavity,
wherein the inflatable fabric includes a fabric lined with a film layer to hermetically seal the fabric, the fabric including one or more sheets of material connected at peripheral edges to form a single chamber of the inflatable fabric, wherein the inflatable fabric is in fluid communication with the pneumatic compressor, wherein the first paddle is configured to be directly coupled to an upper portion of a leg, and wherein the second paddle is configured to be coupled directly to a lower portion of the leg, and
wherein a first portion of the inflatable fabric is disposed within the cavity of the first paddle, a second portion of the inflatable fabric is disposed within the cavity of the second paddle, and an intermediate portion of the inflatable fabric is disposed between the first portion and the second portion of the inflatable fabric; and
a shoe comprising one or more human motion monitoring sensors coupled thereto, the one or more human monitoring sensors in electronic communication with the controller, wherein:
the controller is configured to cause the pneumatic compressor to move a compressed air with the first valve into the inflatable fabric to adjust an angle of the first paddle with respect to the second paddle based upon a gait pattern based on data received from the one or more human motion monitoring sensors.

2. The wearable exoskeleton of claim 1, wherein the pneumatic compressor is configured to move the compressed air into the inflatable fabric to adjust the angle of the first paddle with respect to the second paddle to assist a movement of a human body.

3. The wearable exoskeleton of claim 2, wherein the inflatable actuator provides an assistive force for assisting knee extension in response to the inflatable fabric filling with the compressed air.

4. The wearable exoskeleton of claim 1, further comprising a pressure sensor in fluid communication with the inflatable fabric, wherein the controller is configured to monitor a pressure of the compressed air with the pressure sensor.

5. The wearable exoskeleton of claim 1, wherein:
in response to the first valve moving to the first valve position, the first valve is in fluid communication with the first chamber, and
in response to the first valve moving to the second valve position, the first valve is in fluid communication with the second chamber.

6. The wearable exoskeleton of claim 1, further comprising a lead screw and a connecting member, wherein the electric motor is coupled to the piston via the lead screw and the connecting member.

7. The wearable exoskeleton of claim 1, further comprising a first one-way valve in fluid communication with the first chamber, and a second one-way valve in fluid communication with the second chamber.

8. The wearable exoskeleton of claim 1, further comprising a hose extending from the inflatable fabric, wherein the hose is in fluid communication with the pneumatic compressor.

9. The wearable exoskeleton of claim 1, wherein a heat-sealable thermoplastic polyurethane membrane encased in the fabric.

10. The wearable exoskeleton of claim 1, wherein the one or more human motion monitoring sensors includes a first sensor disposed proximate a heel of the shoe, a second sensor disposed proximate a toe of the shoe, a third sensor disposed proximate a fourth metatarsophalangeal joint location of the shoe, and a fourth sensor disposed proximate a first metatarsophalangeal joint location of the shoe, wherein the data received from the one or more human motion monitoring sensors indicated a heel strike and a toe off, and wherein the controller is further configured to determine the gait pattern based on the data.

11. An inflatable actuator, comprising:
a first paddle disposed at a first end of the inflatable actuator;
a second paddle disposed at a second end of the inflatable actuator; and
an inflatable fabric coupled between the first paddle and the second paddle, the inflatable fabric including a fabric lined with a film layer to hermetically seal the fabric, the fabric including one or more sheets of material connected at peripheral edges to form a single chamber of the inflatable fabric, wherein:
the first paddle and the second paddle each include:
a first half defined by a first flange and a first arcuate flange and a second half defined by a second flange and a second arcuate flange, the first flange and the second flange extending away from the first arcuate flange and the second arcuate flange in a direction such that the first half and the second half comprise opposing concave surfaces defined by the first arcuate flange and the second arcuate flange, the opposing concave surfaces defining a cavity,
the first paddle is configured to be directly coupled to an upper portion of a leg,
the second paddle is configured to be directly coupled to a lower portion of the leg,
an angle of the direction of the first paddle with respect to the direction of the second paddle is configured to vary in response to the single chamber of the inflatable fabric at least one of inflating and deflating,
a first portion of the inflatable fabric is disposed within the cavity of the first paddle,
a second portion of the inflatable fabric is disposed within the cavity of the second paddle, and an intermediate portion of the inflatable fabric is disposed between the first portion and the second portion of the inflatable fabric.

12. The inflatable actuator of claim 11, wherein a length of the inflatable fabric is between five percent and eighty percent of a total length of the inflatable actuator measured from the first end to the second end.

13. The inflatable actuator of claim 12, wherein the length of the inflatable fabric is between ten percent and seventy percent of the total length of the inflatable actuator.

14. The inflatable actuator of claim 12, wherein the length of the inflatable fabric is between fifteen percent and fifty percent of the total length of the inflatable actuator.

15. The inflatable actuator of claim 11, wherein the inflatable fabric comprises a heat-sealable thermoplastic polyurethane membrane encased in a fabric material.

16. The inflatable actuator of claim 11, wherein the inflatable fabric comprises a port configured to couple to a hose to provide fluid communication between a pneumatic compressor and the single chamber of the inflatable fabric.

17. The inflatable actuator of claim 11, wherein the first paddle is configured to align generally parallel with the second paddle in response to the single chamber of the inflatable fabric being inflated with compressed air and transitioning from a deflated state to an inflated state.

18. The inflatable actuator of claim 17, wherein the first paddle is configured to rotate with respect to the second paddle in response to the inflatable fabric transitioning from the inflated state to the deflated state.

19. The inflatable actuator of claim 11, wherein during operation of the inflatable actuator and responsive to the single chamber of the inflatable fabric filling with compressed air, an assistive force for assisting knee extension is provided to a user.

20. The inflatable actuator of claim 11, wherein each first half is coupled parallel to and contacting each second half, each first flange is directly connected to each first arcuate flange, and each second flange is directly connected to each second arcuate flange, and wherein the first portion of the inflatable fabric terminates within the cavity of the first paddle, and the second portion of the inflatable fabric terminates within the cavity of the second paddle.

* * * * *